United States Patent Office 3,216,971
Patented Nov. 9, 1965

3,216,971
LAMINATED STRUCTURES
Louis M. Higashi, San Jose, Calif., assignor to Monsanto Company, a corporation of Delaware
No Drawing. Filed Dec. 16, 1960, Ser. No. 76,119
2 Claims. (Cl. 260—57)

This invention relates to laminated structures having good resistance to elevated temperatures and to methods for preparing same.

There is growing interest in employing thermoset resin-bonded, fiber-reinforced laminates in applications where high strength and resistance to degradation at high temperatures are required. Typical of the applications in which such laminates are employed are structural members in high speed aircraft, nose cones of ballistic missiles, etc. While considerable know-how has been developed as to methods for preparing such laminates so that they will retain a high percentage of their strength after long exposure to high temperatures, there is a pressing need for laminates which have still better resistance to prolonged exposures at high temperatures.

It is an object of this invention to provide thermoset resin-bonded, fiber-reinforced laminates having a high degree of resistance to degradation at elevated temperatures.

Another object of this invention is to provide novel thermosetting resins which can be employed in preparing thermoset resin-bonded, fiber-reinforced laminates.

Other objects and advantages of this invention will be apparent from the following detailed description thereof.

The above and related objects are attained by impregnating at least the surface of a thermoset resin-bonded, fiber-reinforced laminate with a special type of phenol-formaldehyde resin and then curing the adsorbed resin to a thermoset condition at an elevated temperature. The phenol-formaldehyde resin employed in the practice of this invention is prepared by reacting 1 molar proportion of phenol with from 1.04 to 1.24 molar proportions of formaldehyde at a pH of from 0.3 to 3 until the proportion of free formaldehyde present is reduced to a level of from 5 to 12 weight percent, adjusting the reaction mixture to a pH of from 7.5 to 9.2, and further reacting until the proportion of free formaldehyde present is reduced to a level of from 3 to 5 weight percent.

The following examples are set forth to illustrate more clearly the principle and practice of this invention to those skilled in the art. Where quantities are mentioned, they are parts by weight unless otherwise specified.

EXAMPLE I

Part A

A mixture of 100 parts (about 1.06 mol) of phenol, 38 parts (about 1.15 mol) of 91% paraformaldehyde and 0.8 part of oxalic acid dihydrate are charged to a stirred autoclave equipped with a reflux condenser. The reaction mixture, which has a pH of about 1.5, is refluxed under vacuum at 90° C. for about 90 minutes, by which time the quantity of free formaldehyde present is reduced to about 11.5 weight percent. The reaction mixture is then cooled to about 45° C. and 7.5 parts of a 28% aqueous ammonia solution and 2 parts of hexamethylene tetramine are added. The reaction mixture, which now has a pH of about 8.7, is again refluxed, under a pressure of about 3.5 inches of mercury, removing water until a batch temperature of 90° C. is attained and the quantity of free formaldehyde present is reduced to about 3 weight percent. Approximately 20 parts of water are removed in this step. The resin solution is then dehydrated by adding 28 parts of anhydrous isopropanol and azeotroping the mixture under a pressure of about 3.5 inches of mercury until the batch temperature reaches 90° C. Approximately 26 parts of distillate are removed in this step.

Part B

Sheets of glass cloth (E.C.D.–225–181 finished with gamma-aminopropyltriethoxysilane) are impregnated with resin by dipping the cloth in the resin solution prepared in Part A and removing the excess resin solution by drawing the cloth over a scraper bar. The impregnated cloth is heated in an oven for 2 hours at 190° F. to remove the solvent from the impregnated cloth and to partially advance the resin. The resulting cloth contains about 40% resin solids.

Part C

A ⅛″ laminate is prepared from 12 sheets of the resin-impregnated cloth described in Part B employing a conventional vacuum bag-molding technique. The 12 plies of cloth are laid up with the warp running in the same direction in all plies and the assembly is molded under a full vacuum which provides a pressure of approximately about 14 lbs. per square inch. Initially, the temperature is set at 250° F. and is raised to 325° F. over a period of 30 minutes. The assembly is then held at 325° F. for an additional 15 minutes. Thereafter, the assembly is cooled and the laminate is removed from the mold.

Part D

The laminate prepared in Part C is soaked for 15 minutes in the resin solution prepared in Part A and the excess resin is removed from the laminate. The laminate is then dried for 10 hours at 210° F. The resin solution absorbed constitutes about 2% of the original weight of the laminate. The impregnated laminate is then post-cured by heating for 8 hours at 325° F. and an additional 5 hours at 375° F.

EXAMPLE II

A mixture of 100 parts (about 1.06 mol) of phenol, 38 parts (about 1.15 mol) of 91% paraformaldehyde and 0.9 parts of a 0.25% aqueous hydrochloric acid solution are charged to a stirred autoclave equipped with a reflux condenser. The reaction mixture, which has a pH of about 0.5, is refluxed under vacuum at 90° C. for about 90 minutes, by which time the quantity of free formaldehyde present is reduced to about 6.2 weight percent. The reaction mixture is then partially dehydrated by distilling at a pressure of about 3.5 inches of mercury until the boiling point of the reaction mixture falls to about 55° C. Approximately 12 parts of distillate are removed in this step. About 1.1 parts of triethylamine are added, bringing the reaction mixture to a pH of about 8. The reaction mixture is again refluxed, under vacuum, at a temperature of 80° C. for about 40 minutes, by which time the quantity of free formaldehyde present is reduced to about 4.7 weight percent. The resin solution is then dehydrated by adding 37 parts of anhydrous propanol and azeotroping the mixture under a pressure of about 3.5 inches of mercury until the batch temperature reaches 90° C. Twelve-ply glass laminates are then prepared as in Example I, Parts B, C, and D.

Laminates prepared as in Examples I and II exhibit flexural strengths at 500° F. of from about 25,000 to 40,000 p.s.i. after being maintained at 500° F. for 100 hours, employing Federal Specification L–P–406 Test Method No. 1031.

The thermoset resin-bonded, fiber-reinforced laminates whose surfaces are impregnated by the method of the invention are well-known in the art. In various embodiments these bonded laminates may comprise a multi-layer assembly of resin impregnated reinforcing webs, pressed blocks of resin and fibrous material, resin-impregnated webs in tape form, etc. The reinforcing web constituting the same may be cloth, batts or rovings of glass fibers, metal filaments, asbestos, polyacrylonitrile, nylon or similar high melting materials. The thermosetting resin employed to bond the reinforcing webs may be a polyester resin, i.e., a blend of an unsaturated alkyd resin and a polymerizable monomer such as styrene; an ethoxyline resin, e.g., a condensate of bisphenol-A and epichlorohydrin; a silicone resin; a phenol-formaldehyde resin; a silicone-modified phenolic resin or the like. For simplicity, the special impregnating resin, hereinafter described, has been used in the examples as the bonding resin. However, any of the conventional thermosetting resins, for example, those mentioned in this paragraph may be used with equivalent results. As is known, the reinforcing web should be treated with a suitable finishing agent to obtain good adhesion between the reinforcing web and the thermosetting resin. For an excellent review of the materials and techniques to be employed to prepare such structures, see the Society of Plastics Engineering Journal, 13, pages 42–46, August 1957, which description is incorporated herein by reference. Typical of such finishing agents are gamma-aminopropyltriethoxysilane and Werner type compounds formed between chromium compounds and methacrylic acid as represented by the Volan bonding agents supplied by the E. I. du Pont Company.

The surface of the laminate may be impregnated with the novel phenol-formaldehyde resin, hereinafter described, by any suitable means such as roll-coating, brushing, spraying, etc. In general, however, it is preferred to dip the laminate in the resin solution for a period of at least 2 and preferably 5 or more minutes to insure maximum penetration of the resin into the body of the laminate. After the laminate has been impregnated with the phenol-formaldehyde resin, the resin is cured to a thermoset condition at an elevated temperature. Preferably, this cure is effected over an extended period of time at a temperature in the range of 200–400° F. For the best results, the laminate is impregnated with the phenol-formaldehyde resin before being post-cured and, after being impregnated with the phenol-formaldehyde resin, the laminate is heated for 8–15 hours at a temperature of 275–400° F.

The method of this invention is particularly valuable in up-grading the heat resistance of relatively low density laminates that are prepared by low pressure laminating methods. Typical examples of such laminates are those which are prepared at a laminating pressure of about 14 lbs. per square inch by the well-known vacuum bag-molding process. In a preferred embodiment of the invention a laminate is prepared by pressing an assembly of resin-impregnated plies of glass cloth for 30–60 minutes at a temperature of 250–350° F. and a pressure of about 14 lbs. per square inch. The laminate is then dipped in a solution of the special phenol-formaldehyde resin and heated for 5–12 hours at 180–220° F. to remove the solvent from the impregnating resin solution and to partially cure the resin. Thereafter, the impregnated laminate is post-cured by heating for 8–15 hours at a temperature of 275–400° F.

The special phenol-formaldehyde resins of this invention are prepared by reacting 1 molar proportion of phenol with from 1.04 to 1.24 molar proportions of formaldehyde under acid conditions to a first critical end-point, then under alkaline conditions to a final critical end-point. The formaldehyde employed may be in aqueous solution such as formalin, but preferably is in the form of paraformaldehyde. In a preferred embodiment, the molar proportion of formaldehyde to phenol is in the range of from 1.14:1 to 1.18:1.

The initial condensation is effected under acid conditions, i.e., at a pH of from 0.3 to 3 until the proportion of free formaldehyde remaining in the reaction mixture is in the range of from 5 to 12 weight percent, based upon total formaldehyde charged. In this step, the essential factors affecting the efficacy of the ultimate resin are the pH of the system and the percentage of free formaldehyde remaining at the end of the step. Therefore, any organic or mineral acid or acid salt capable of effecting the desired pH may be employed. Oxalic acid and hydrochloric acid have been shown in the examples but may be replaced with equivalent results, with such acids or acid salts as, for example, phenol sulfonic acid, toluene sulfonic acid, sulfuric acid, sulfurous acid, phosphoric and phosphorous acid, formic acid, glacial acetic acid, lactic acid, boron trichloride, phosphorous trichloride, silicon-tetrachloride, titanium tetrachloride, aluminum chloride, etc. Mixtures of the same may also be used.

The condensation is concluded under alkaline conditions, i.e., at a pH of from 7.5 to 9.2, until the proportion of free formaldehyde present in the reaction mixture is in the range of from 3 to 5 weight percent, based upon total formaldehyde. Again, the essential factors in this step are pH and the final percentage of free formaldehyde. Thus, a wide range of organic and inorganic bases may be employed. Ammonia and hexamethylene tetramine in combination as well as triethylamine have been shown in the examples. However, other bases which may be used in place thereof with equivalent results include, for example: ammonia; morpholine; N-methyl morpholine; piperazine; tertiary amines such as trimethylamine, tri-n-propylamine, tri-isobutylamine, triphenylamine, etc.; hexamethylene tetramine; tetraalkyl ammonium hydroxides such as tetramethyl ammonium hydroxide; alkaline earth and alkali metal hydroxides such as lithium hydroxide, potassium hydroxide, sodium hydroxide, barium hydroxide, etc. Mixtures of such bases may be employed when desired. When alkaline earth or alkali metal cations are present in the resinous system because of the use of bases containing the same, it is preferred to remove such cations, using, for example, conventional techniques such as precipitation thereof as an insoluble salt followed by filtration, etc.

For use, the resin should be substantially anhydrous. Water present should be removed as far as is practically possible. Conventional techniques may be employed. However, since it is desired to ultimately obtain and use the completed resin in the form of an alcoholic solution thereof, the water-bearing resinous mixture is advantageously combined with the desired alcohol to form an azeotrope and the water removed by azeotropic distillation. The substantially anhydrous phenol-formaldehyde resin is finally adjusted to an alcoholic solution containing from 40 to 70 weight percent solids; the alcohol employed being a low boiling acyclic alcohol containing from 1 to 4 carbon atoms such as, for example, methanol, ethanol, n-propanol, isopropanol, butanol, ethylene glycol, propylene glycol, etc.

While not necessarily a limiting factor, practical considerations balancing speed of reaction with adequate control over the reaction lead to the use of a temperature range of from about 80 to 90° C. during both the acid and alkaline condensation steps. Control and adjustment of vacuum or pressure within the reaction system will allow the practitioner to maintain any temperature or temperature cycle he may desire to use. For example, the condensation may, at the practitioner's option, be conducted at constant temperature of from 60 to 110° C., for example, or at varying temperatures according to a determined cycle. The criticality of the aforementioned pH ranges, on both the acid and basic sides, are a matter of control of the rate of the reaction. The criticality of the percentages of free formaldehyde remaining at the end-point of the acid-condensation step and that remaining in the final resin has been mentioned. The reasons for such criticality at the end-point of the acid step are not fully understood and will not be speculated upon. However, with regard to the requirement that the final resin contain from 3 to 5 weight percent of free formaldehyde, it has been observed that at below 3% the resin is so far advanced that final cure of the laminate fails to fully develop the high temperature strength sought, whereas at above 5% said final cure proceeds at a slower rate with a resulting loss of sufficient of the free formaldehyde to again prevent full development of the high temperature properties of the laminate. However, it should be emphasized that while the specified range of from 3 to 5 weight percent free formaldehyde is necessary to provide the maximum high temperature properties required for exacting missile and high speed aircraft applications, resins of higher or lower free formaldehyde content may be similarly fabricated into laminates intended for use in less exacting applications.

The above descriptions and particularly the examples are set forth for purposes of illustration only. Many other variations and modifications of the invention will be apparent to those skilled in the art and can be made without departing from the spirit and scope of the invention herein described.

What is claimed is:

1. The method of preparing a resin which comprises reacting 1 molar proportion of phenol with from 1.04 to 1.24 molar proportions of formaldehyde at a pH of from 0.3 to 3 until the proportion of free formaldehyde present is reduced to a level of from 5 to 12 weight percent, based upon total formaldehyde charged, adjusting the reaction mixture to a pH of from 7.5 to 9.2, and further reacting until the proportion of free formaldehyde present is reduced to a level of from 3 to 5 weight percent, based upon total formaldehyde charged.

2. A resin prepared by the method of claim 1.

References Cited by the Examiner

UNITED STATES PATENTS

| | | | |
|---|---|---|---|
| 2,473,145 | 6/49 | Hesselbart | 260—57 |
| 2,714,098 | 7/55 | Martin | 260—38 |
| 2,810,674 | 10/57 | Madden | 154—140 |
| 2,901,337 | 8/59 | Kentgen et al. | 260—59 XR |
| 2,941,918 | 6/60 | West et al. | 260—59 XR |

EARL M. BERGERT, Primary Examiner.

CARL F. KRAFFT, Examiner.